US012677717B1

(12) United States Patent
Smith et al.

(10) Patent No.: US 12,677,717 B1
(45) Date of Patent: Jul. 14, 2026

(54) EQUINE FOOTING CONDITIONING TOOLS

(71) Applicant: ABI Attachments, Inc., Mishawaka, IN (US)

(72) Inventors: Nathaniel Lee Smith, Goshen, IN (US); Joshua James Forbess Rix, Walkerton, IN (US)

(73) Assignee: ABI Attachments, Inc., Mishawaka, IN (US)

( * ) Notice: Subject to any disclaimer, the term of this patent is extended or adjusted under 35 U.S.C. 154(b) by 372 days.

(21) Appl. No.: 18/469,279

(22) Filed: Sep. 18, 2023

(51) Int. Cl.
*A01B 31/00* (2006.01)

(52) U.S. Cl.
CPC .................................... *A01B 31/00* (2013.01)

(58) Field of Classification Search
CPC ...................................................... A01B 31/00
See application file for complete search history.

(56) References Cited

U.S. PATENT DOCUMENTS

| | | | | |
|---|---|---|---|---|
| 600,659 | A | * | 3/1898 | Whipple ................. A01B 31/00 |
| | | | | 172/627 |
| 609,981 | A | * | 8/1898 | Whipple ................. A01B 31/00 |
| | | | | 172/388 |
| 611,160 | A | * | 9/1898 | Whipple ................. A01B 31/00 |
| | | | | 172/388 |
| 636,477 | A | * | 11/1899 | Whipple ................. A01B 31/00 |
| | | | | 172/627 |

| | | | | |
|---|---|---|---|---|
| 644,045 | A | * | 2/1900 | Albright ................. A01B 31/00 |
| | | | | 172/388 |
| 6,119,792 | A | | 9/2000 | Almer |
| 7,063,166 | B1 | | 6/2006 | Grosberg |
| 8,944,176 | B2 | * | 2/2015 | Kiser ..................... A01B 49/02 |
| | | | | 172/199 |
| 11,564,342 | B1 | | 1/2023 | Estes |
| 11,570,942 | B1 | * | 2/2023 | Buffi ..................... A01B 63/10 |
| 2006/0005524 | A1 | | 1/2006 | Crosby |
| 2008/0011494 | A1 | * | 1/2008 | Collins ................. A01B 49/027 |
| | | | | 172/349 |
| 2012/0298386 | A1 | * | 11/2012 | Steffan ................... A01B 31/00 |
| | | | | 172/138 |

FOREIGN PATENT DOCUMENTS

| | | | | |
|---|---|---|---|---|
| DE | 10200500498 | | 8/2006 | |
| DE | 202017102272 | | 6/2017 | |
| EP | 0288125 | A1 * | 10/1988 | .......... A01B 59/064 |
| FR | 2820604 | A1 * | 8/2002 | ............ A01B 31/00 |
| KR | 20190100987 | A * | 8/2019 | ............ A01B 63/22 |
| WO | 2023017093 | | 2/2023 | |

* cited by examiner

*Primary Examiner* — Matthew R Buck

(74) *Attorney, Agent, or Firm* — Taft Stettinius & Hollister LLP

(57) ABSTRACT

Am equine footing conditioning tool includes a chassis, a tow hitch a first ground-conditioning basket rotatably coupled with the chassis, a second ground-conditioning basket rotatably coupled with the chassis A first tool adjustment and a second tool adjustment assembly are adjustably coupled with the chassis. A tow hitch assembly coupled with the chassis and configured to couple the equine footing conditioning tool with a vehicle.

18 Claims, 16 Drawing Sheets

EQUINE FOOTING CONDITIONING TOOLS

BACKGROUND

The present disclosure relates synthetic equine footing conditioning tools and related apparatuses, methods, systems, and techniques. A number of tools have been proposed for conditioning equine footings. Heretofore, such tools have suffered from a number of drawbacks and disadvantages. There remains a substantial need for the unique apparatuses, systems, and methods disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

One embodiment is a unique equine footing conditioning tool. Other embodiments, forms, objects, features, advantages, aspects, and benefits shall become apparent from the following description and drawings.

DETAILED DESCRIPTION OF EXAMPLE EMBODIMENTS

Figure 1:
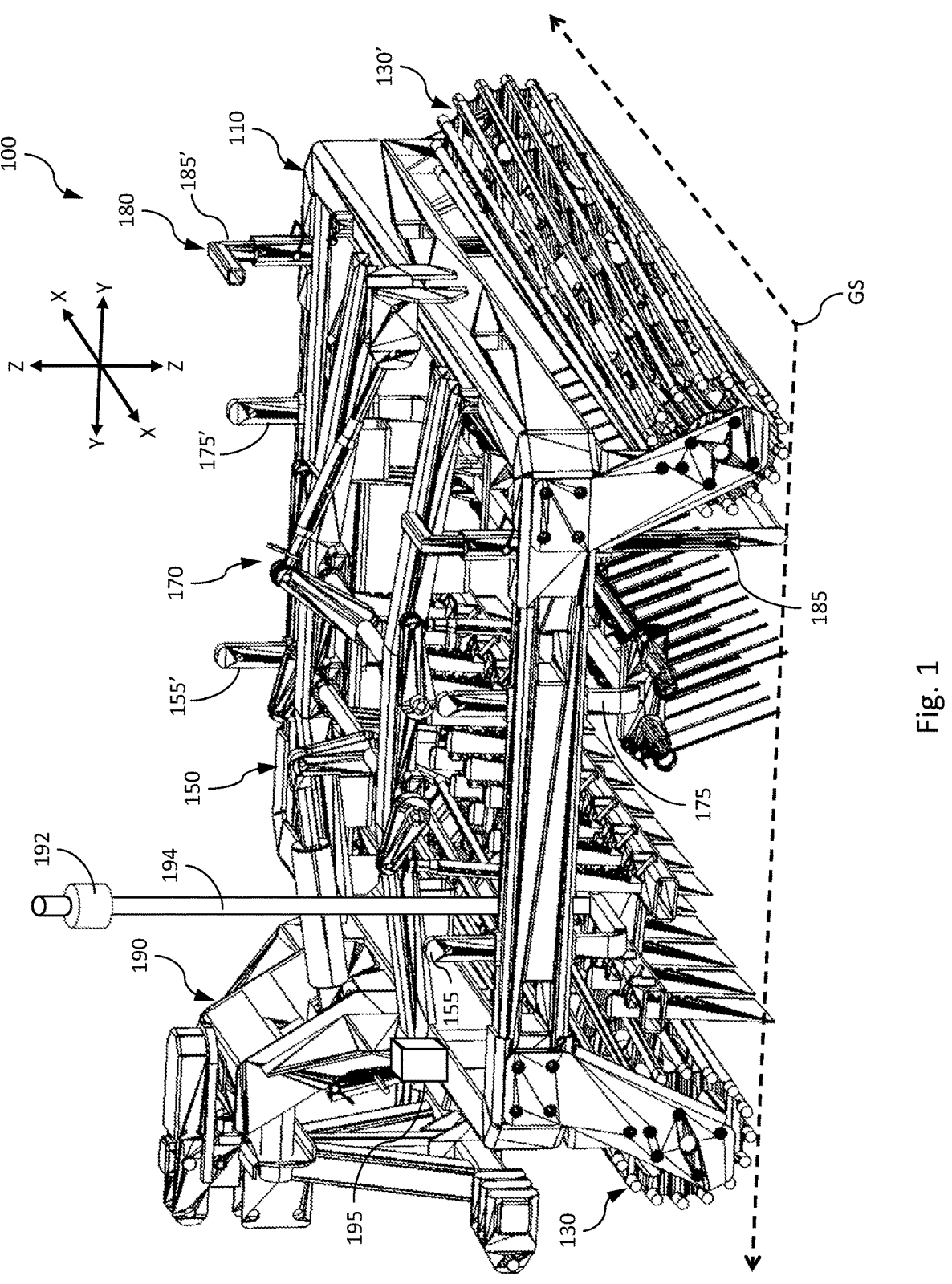
FIG. 1 is a perspective view illustrating certain aspects of an example equine footing conditioning tool.
Figure 2:
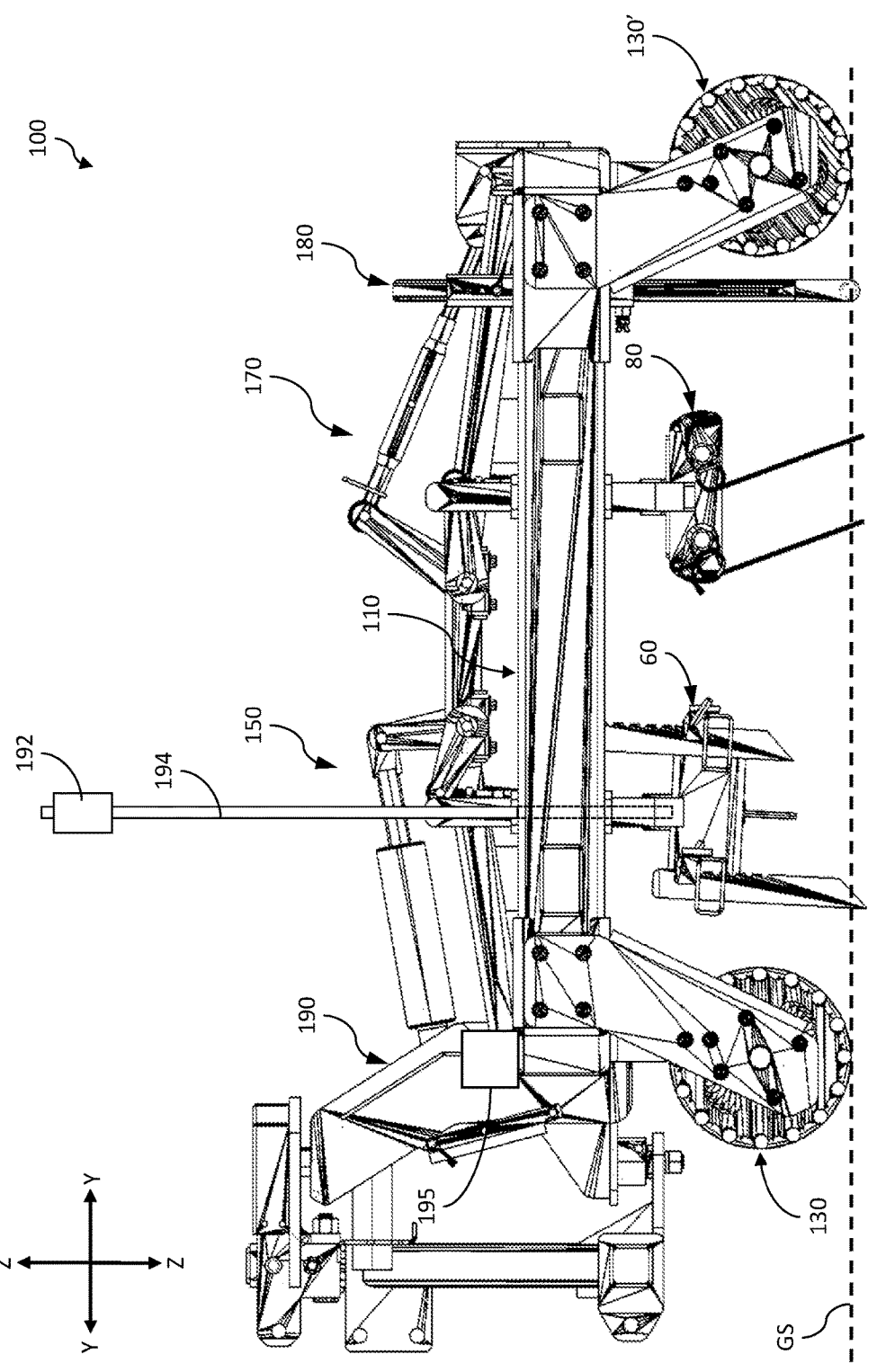
FIG. 2 is a side view illustrating certain aspects of the example equine footing conditioning tool of FIG. 1.
Figure 3:
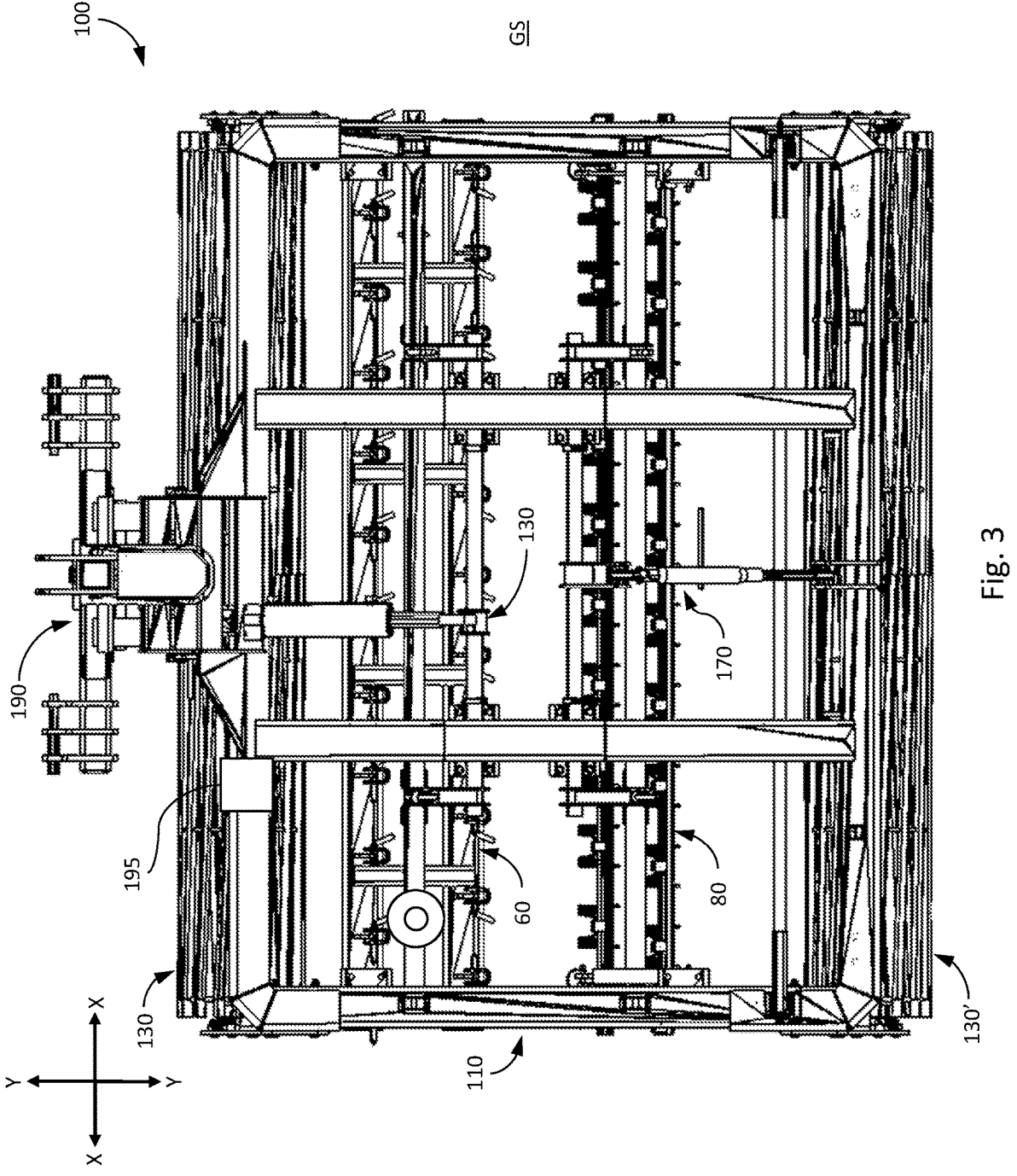
FIG. 3 is a top view illustrating certain aspects of the example equine footing conditioning tool of FIG. 1.

Referring to the figures, and with initial reference to FIGS. 1-3, there is illustrated an example equine footing conditioning tool 100 (also referred to herein as tool 100). Tool 100 comprises a chassis 110, a forward rolling basket 130 rotatably coupled with the chassis 110, a rearward rolling basket 130' rotatably coupled with the chassis 110 and spaced apart from the forward rolling basket 130, tool adjustment assemblies 150, 170, 180, and hitch 190.

Forward rolling basket 130 and rearward rolling basket 130' are positioned to extend below chassis 110 to support chassis 110 above an underlying ground surface GS in deployed or operational configuration of tool 100 such as the configurations illustrated in FIGS. 1-3. It shall be appreciated that tool 100 may also be configured in a non-deployed transport configuration as further described herein.

It shall be appreciated that underlying ground surface GS is a part of a preferred environment for operation of the equine footing conditioning tools disclosed herein and, more particularly, is preferably a synthetic equine footing surface comprising a blend or mixture of human-synthesized components or human-synthesized components and naturally-occurring components.

Figure 4:
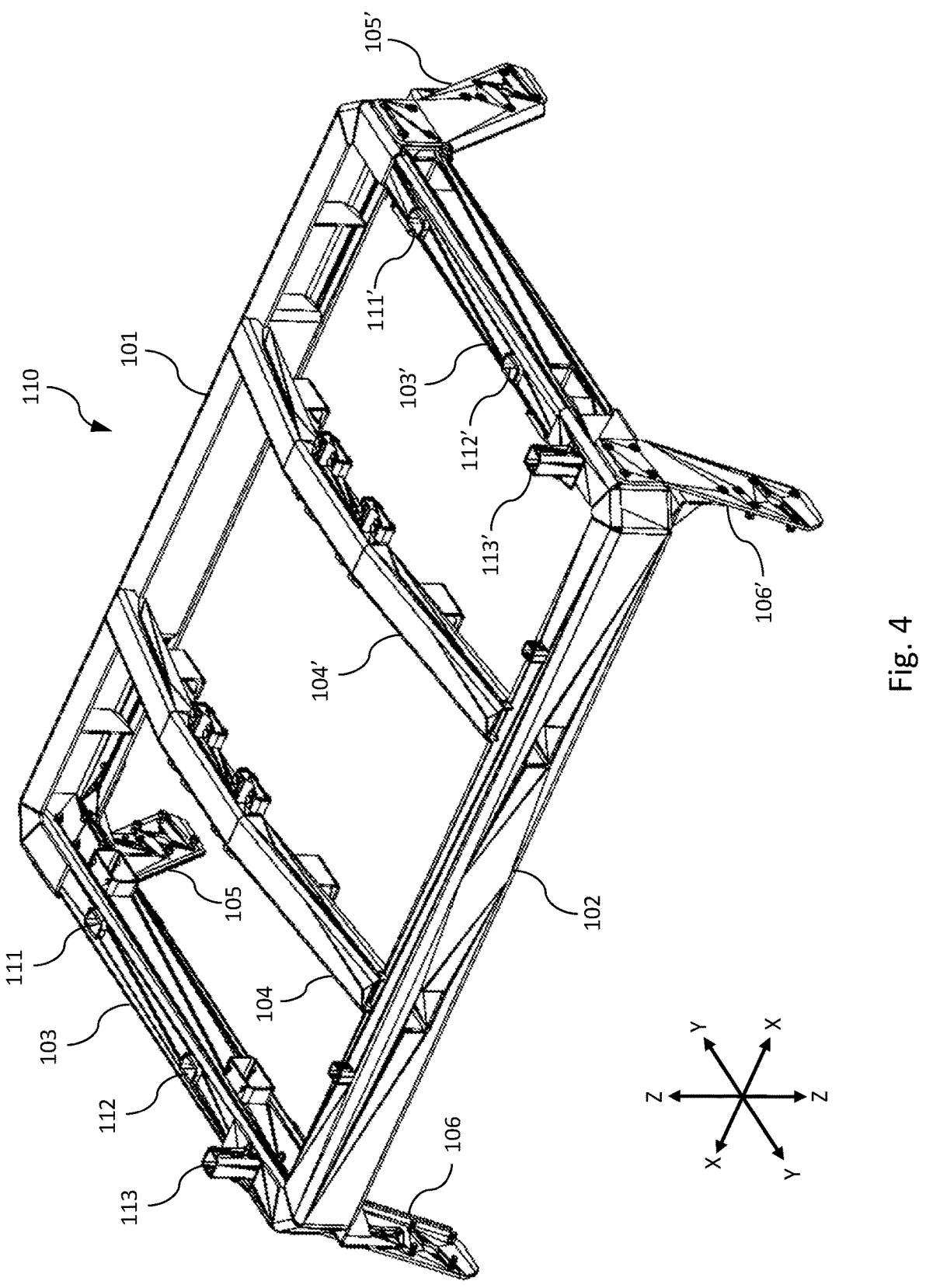
FIG. 4 is a perspective view of illustrating certain aspects of a chassis of the example equine footing conditioning tool of FIG. 1.
Figure 5:
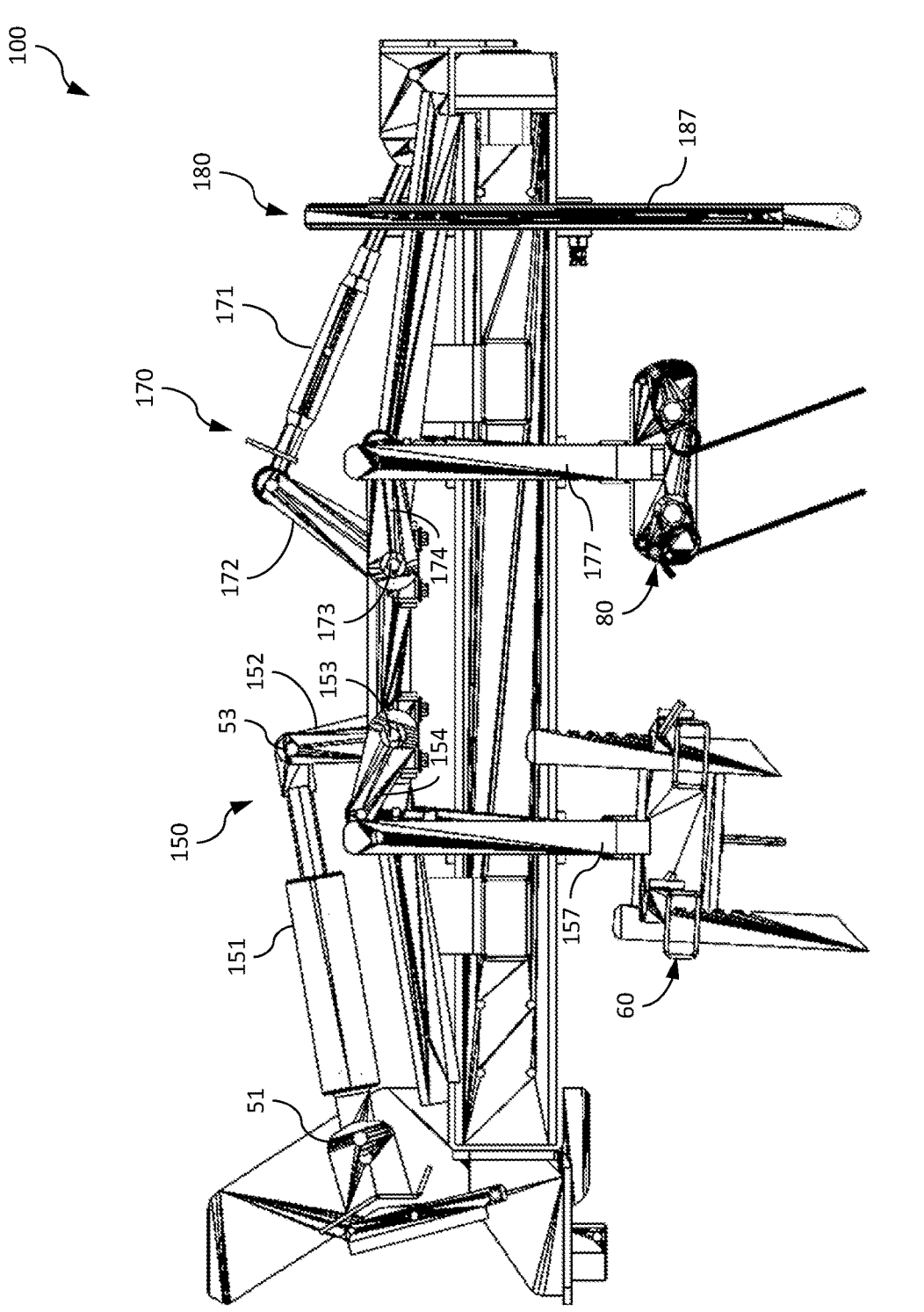
FIG. 5 is a perspective view of illustrating certain aspects of the chassis, tool adjustment assemblies, and ground engaging tools of the example equine footing conditioning tool of FIG. 1.
Figure 6:
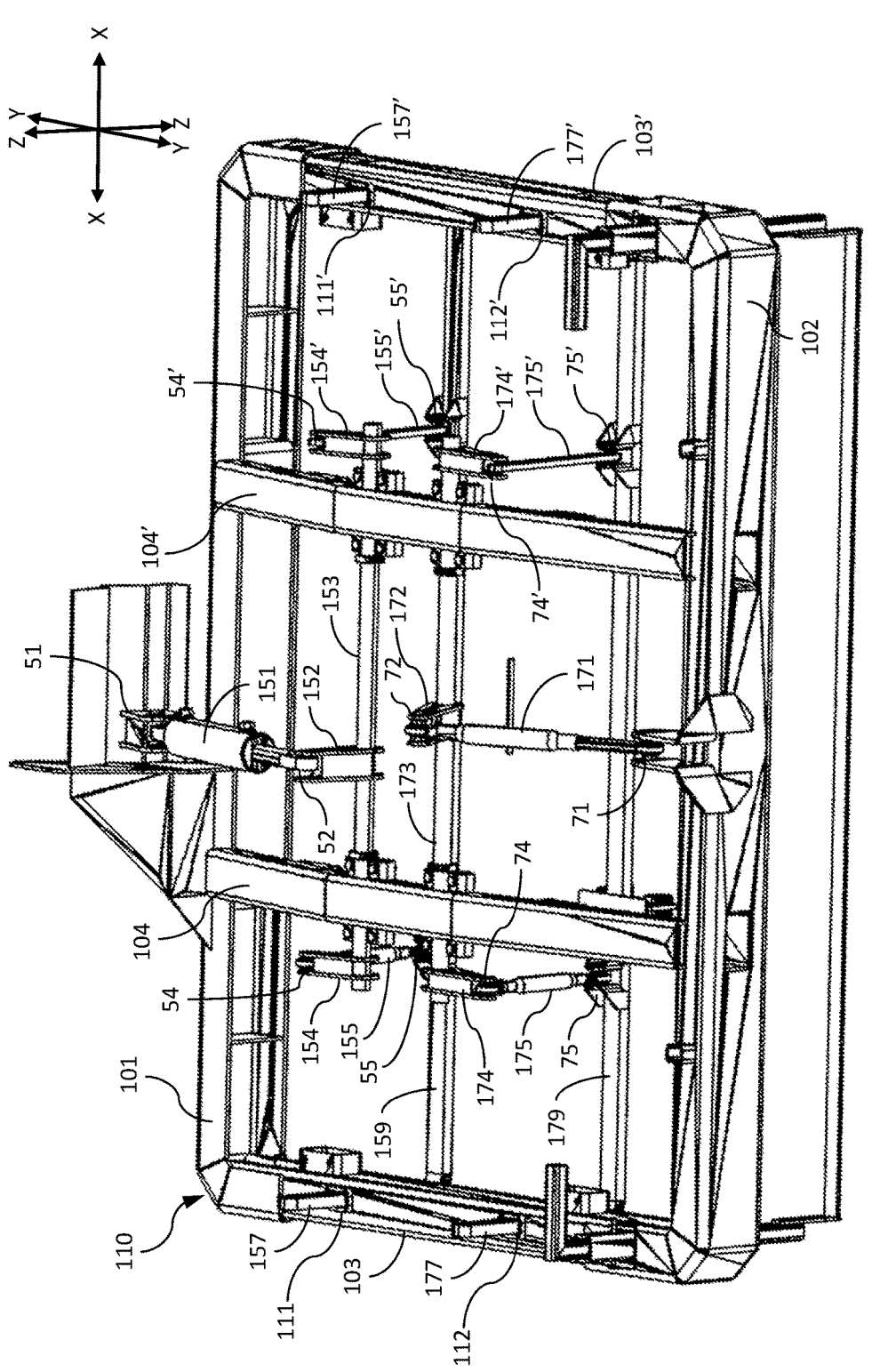
FIG. 6 is a side view of illustrating certain aspects of the chassis and the tool adjustment assemblies of the example equine footing conditioning tool of FIG. 1.

As most simply depicted in FIG. 4, chassis 110 comprises a forward lateral beam 101 and a rearward lateral beam 102 which extend in an X-axis direction laterally across a width of the frame. Chassis 110 also comprises an outer longitudinal beams 103, 103' and inner longitudinal beams 104, 104' which are coupled with and extend intermediate forward lateral beam 101 and a rearward lateral beam 102 and a rearward lateral beam 102 in a Y-axis direction along the length of the chassis 110.

Outer longitudinal beam 103 is provided with guide apertures 111, 112, 113 which extend vertically in a Z-axis direction. In the illustrated embodiment, guide apertures 111, 112, 113 pass through a central portion of outer longitudinal beam 103. In other embodiments, guide apertures 111, 112, 113 may be coupled with outer longitudinal beam 103 in other manners, for example, by being coupled with a side of beam 103. In other embodiments, guide apertures 111, 112, 113 may be coupled with other structures of chassis 110.

Guide aperture 111 is configured to slidably receive transfer bar 155 of tool adjustment assembly 150 which is vertically moveable therein in the Z-axis direction during adjustment of tool adjustment assembly 150. Guide aperture 112 is configured to slidably receive transfer bar 175 of tool adjustment assembly 170 which is vertically moveable therein in the Z-axis direction during adjustment of tool adjustment assembly 170. Guide aperture 113 is configured to slidably receive transfer bar 185 of tool adjustment assembly 180 which is vertically moveable therein in the Z-axis direction during adjustment of tool adjustment assembly 180.

Outer longitudinal beam 103' is provided with guide apertures 111', 112', 113' which extend vertically in a Z-axis direction. In the illustrated embodiment, guide apertures 111', 112', 113' pass through a central portion of outer longitudinal beam 103'. In other embodiments, guide apertures 111', 112', 113' may be coupled with outer longitudinal beam 103 in other manners, for example, by being coupled with a side of beam 103'. In other embodiments, guide apertures 111', 112', 11'3 may be coupled with other structures of chassis 110'.

Guide aperture 111' is configured to slidably receive transfer bar 155' of tool adjustment assembly 150 which is vertically moveable therein in the Z-axis direction during adjustment of tool adjustment assembly 150. Guide aperture 112' is configured to slidably receive transfer bar 175' of tool adjustment assembly 170 which is vertically moveable therein in the Z-axis direction during adjustment of tool adjustment assembly 170. Guide aperture 113' is configured to slidably receive transfer bar 185' of tool adjustment assembly 180 which is vertically moveable therein in the Z-axis direction during adjustment of tool adjustment assembly 180.

Chassis 110 further comprises forward legs 105, 105' and rearward legs 106, 106'. Forward legs 105, 105' are operatively coupled with and extend downward in a Z-axis direction relative to outer longitudinal beams 103, 103' proximate their coupling with rearward lateral beam 102. In some embodiment, forward legs 105, 105' may be additionally or alternatively coupled with rearward lateral beam 102 proximate its coupling with outer longitudinal beams 103, 103'. In some embodiment, forward legs 105, 105' may be additionally or alternatively coupled with other structures of chassis 110 including, for example, inner longitudinal beams 104, 104' or other chassis structures as will occur to one of skill in the art with the benefit and insight of the present disclosure.

Rearward legs 106, 106' are operatively coupled with and extend downward in a Z-axis direction relative to outer longitudinal beams 103, 103' proximate their coupling with forward lateral beam 101. In some embodiment, rearward legs 107, 107' may be additionally or alternatively coupled with forward lateral beam 101 proximate its coupling with outer longitudinal beams 103, 103'. In some embodiment, rearward legs 107, 107' may be additionally or alternatively coupled with other structures of chassis 110 including, for example, inner longitudinal beams 104, 104' or other chassis structures as will occur to one of skill in the art with the benefit and insight of the present disclosure.

Figure 7:
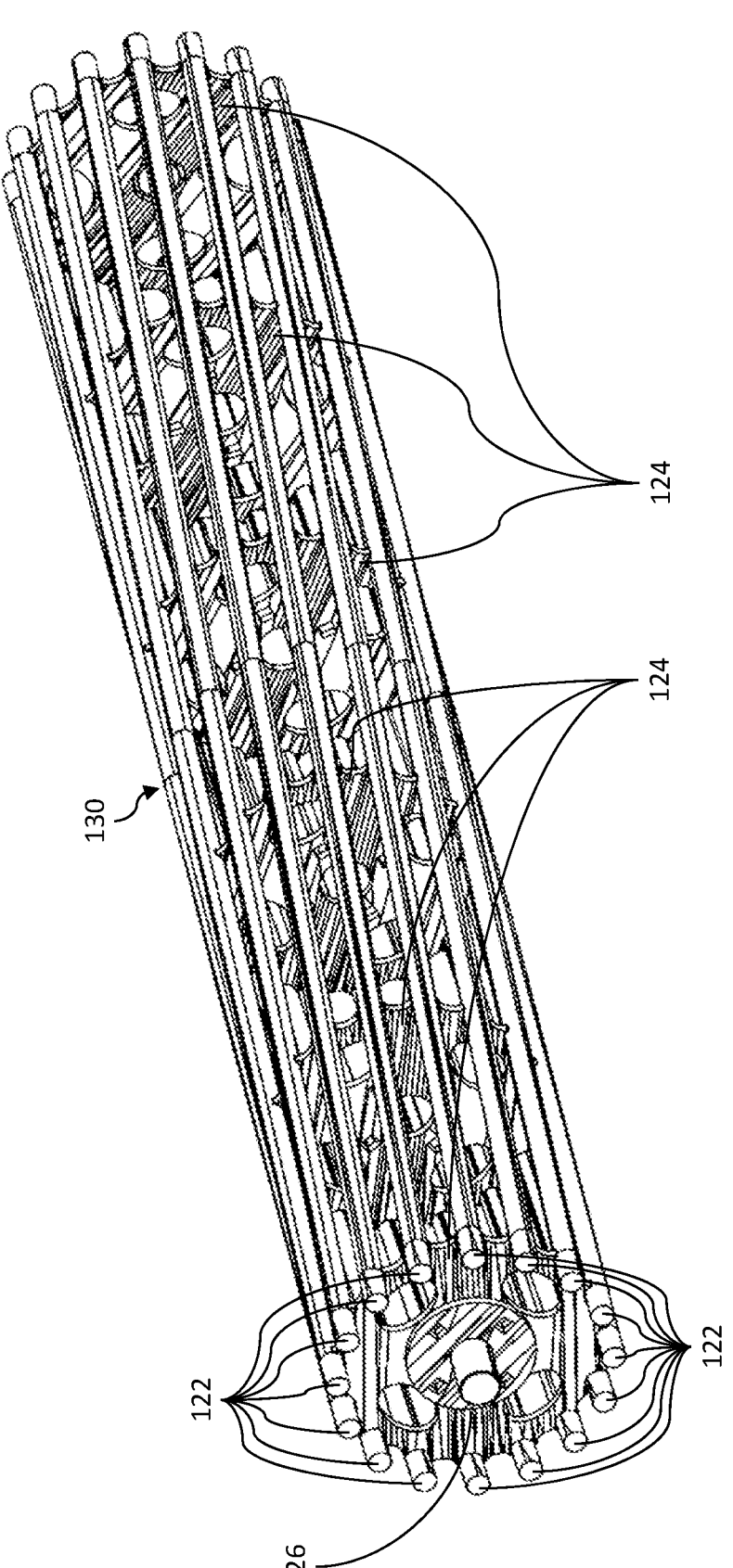
FIG. 7 is a perspective view of illustrating certain aspects of a rolling basket of the example equine footing conditioning tool of FIG. 1.
Figure 8:
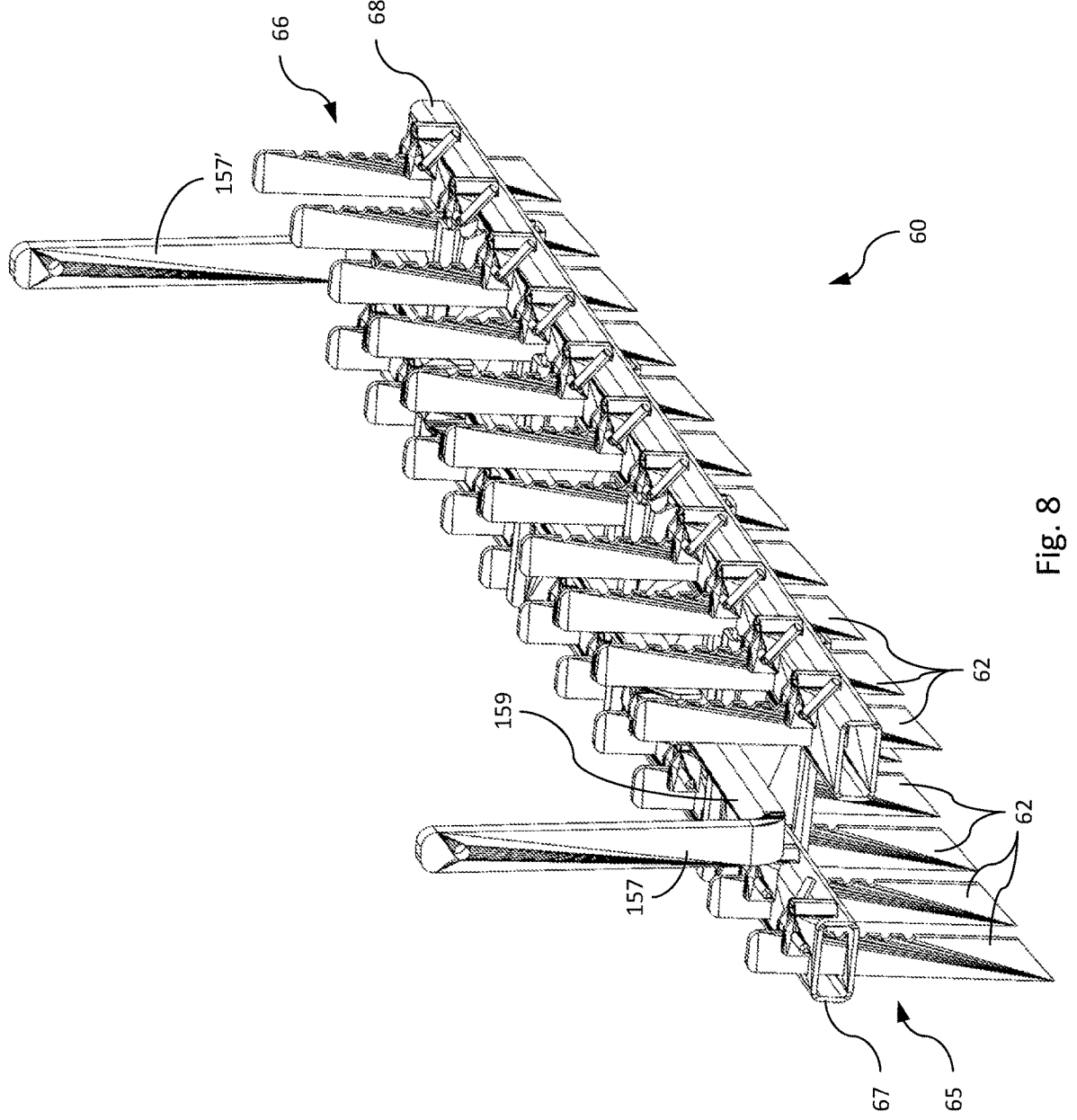
FIG. 8 is a perspective view of illustrating certain aspects of a ground engaging tool of the example equine footing conditioning tool of FIG. 1.
Figure 9:
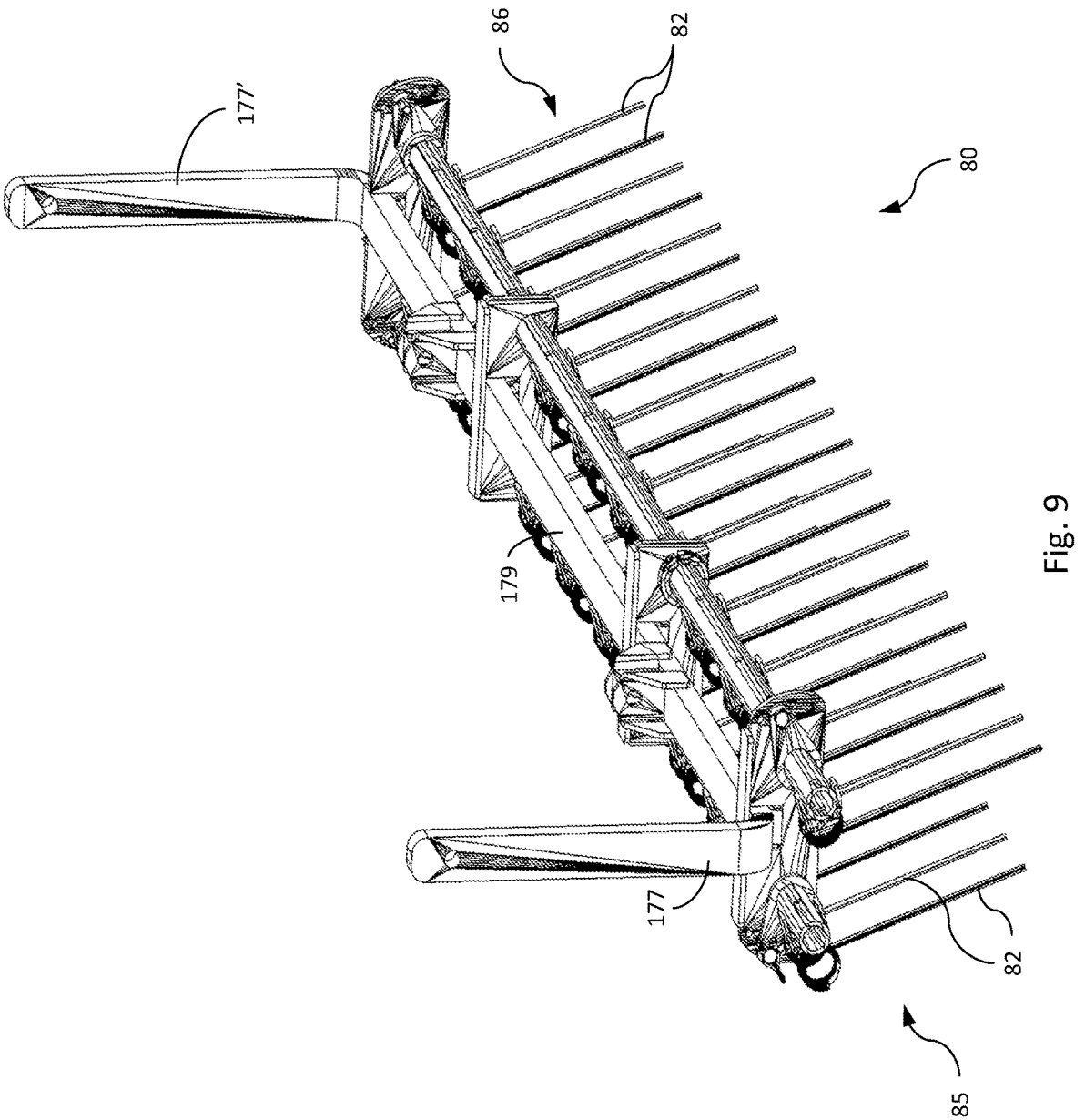
FIG. 9 is a perspective view of illustrating certain aspects of a ground engaging tool of the example equine footing conditioning tool of FIG. 1.
Figure 10:
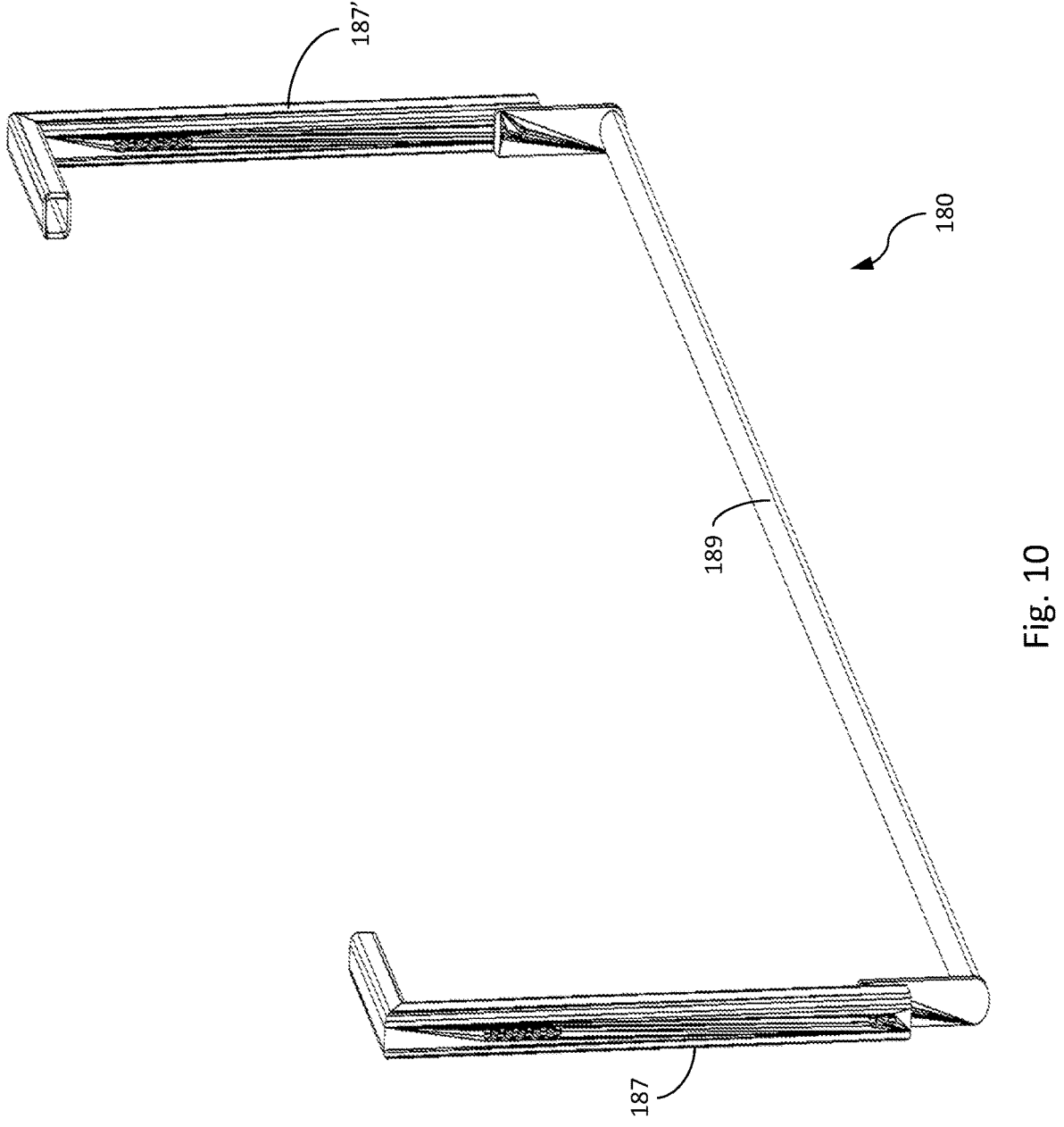
FIG. 10 is a perspective view of illustrating certain aspects of a ground engaging tool of the example equine footing conditioning tool of FIG. 1.
Figure 11:
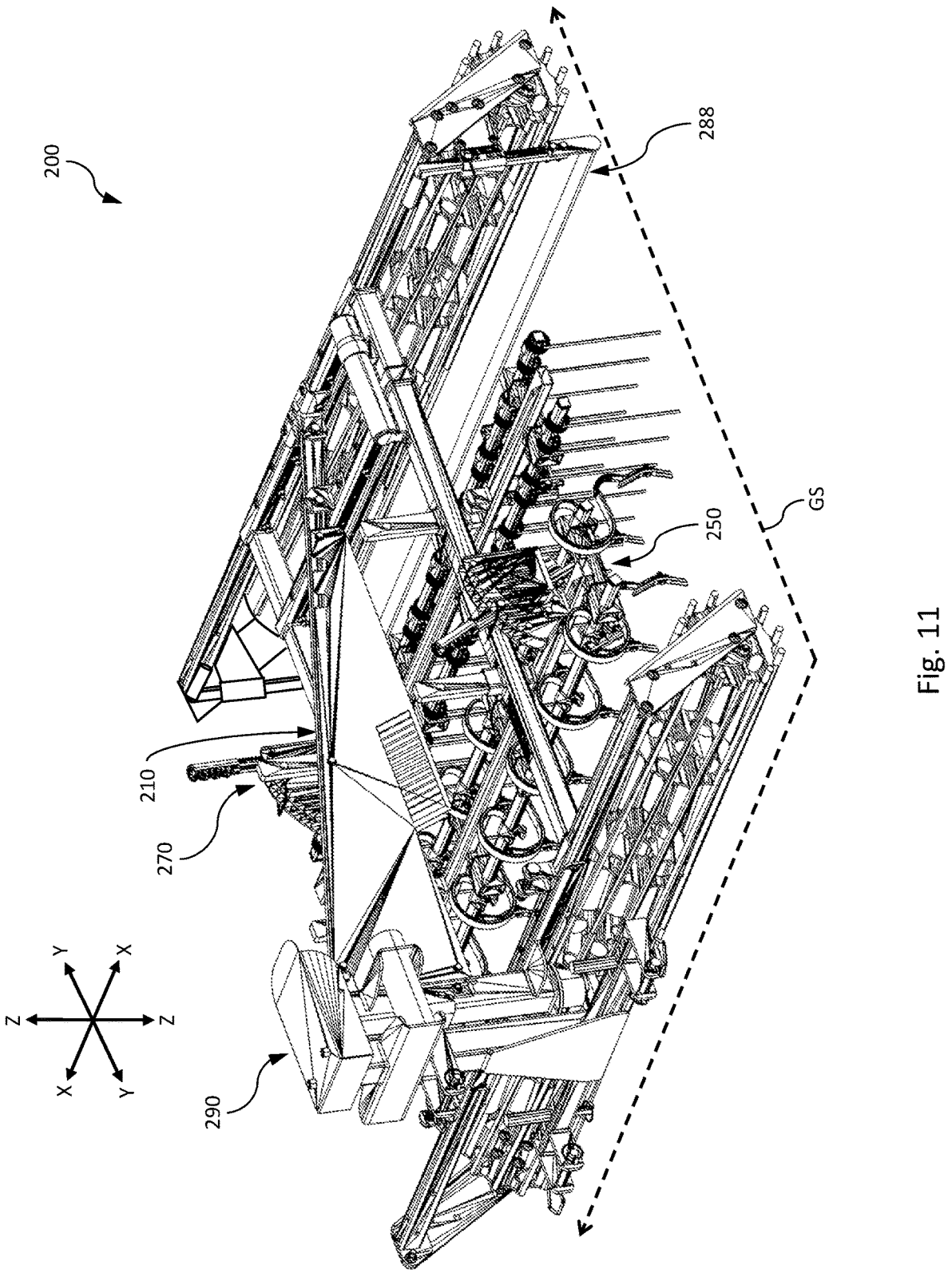
FIG. 11 is a perspective view illustrating certain aspects of an example equine footing conditioning tool.
Figure 12:
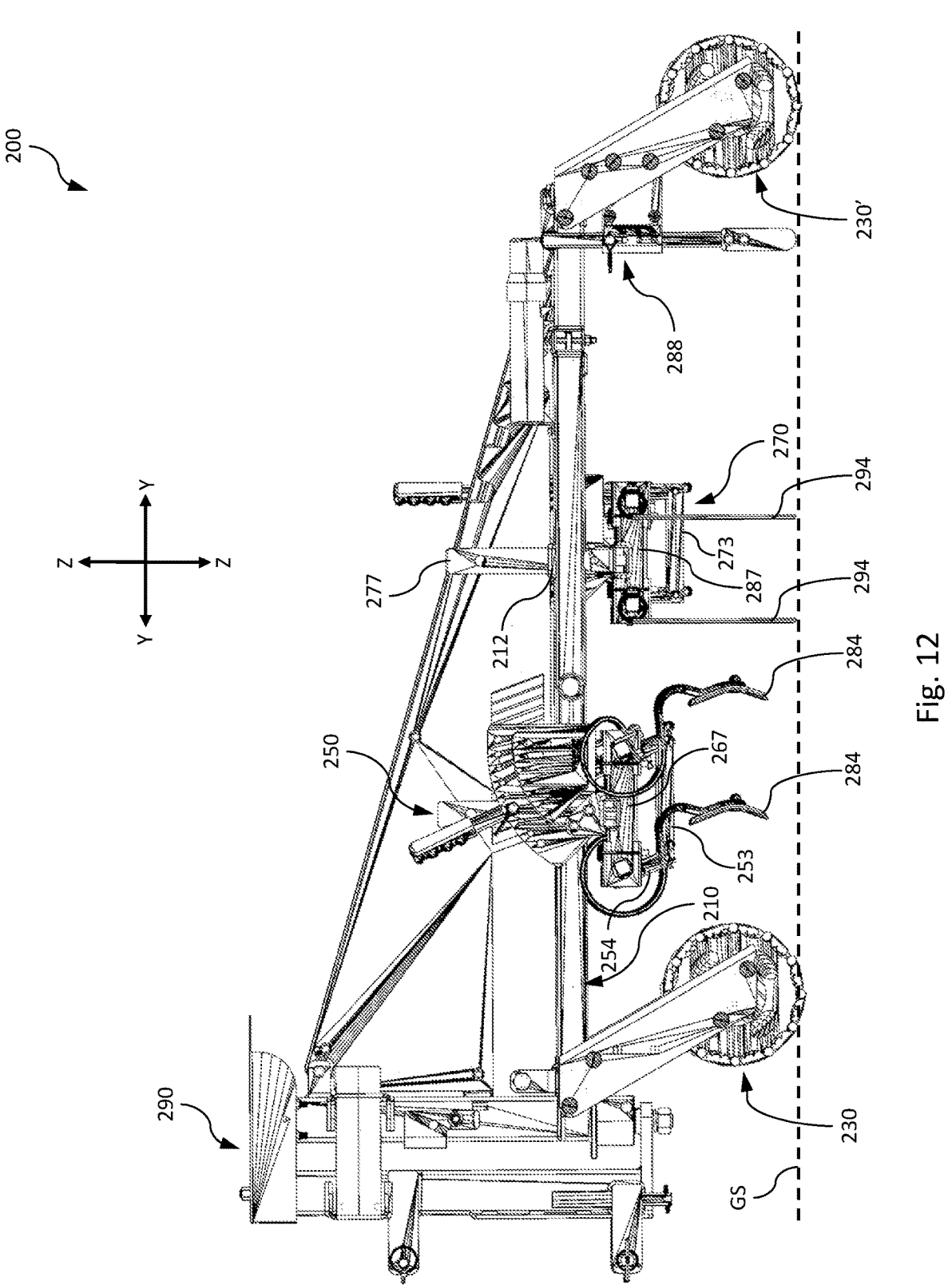
FIG. 12 is a side view illustrating certain aspects of the example equine footing conditioning tool of FIG. 11.
Figure 13:
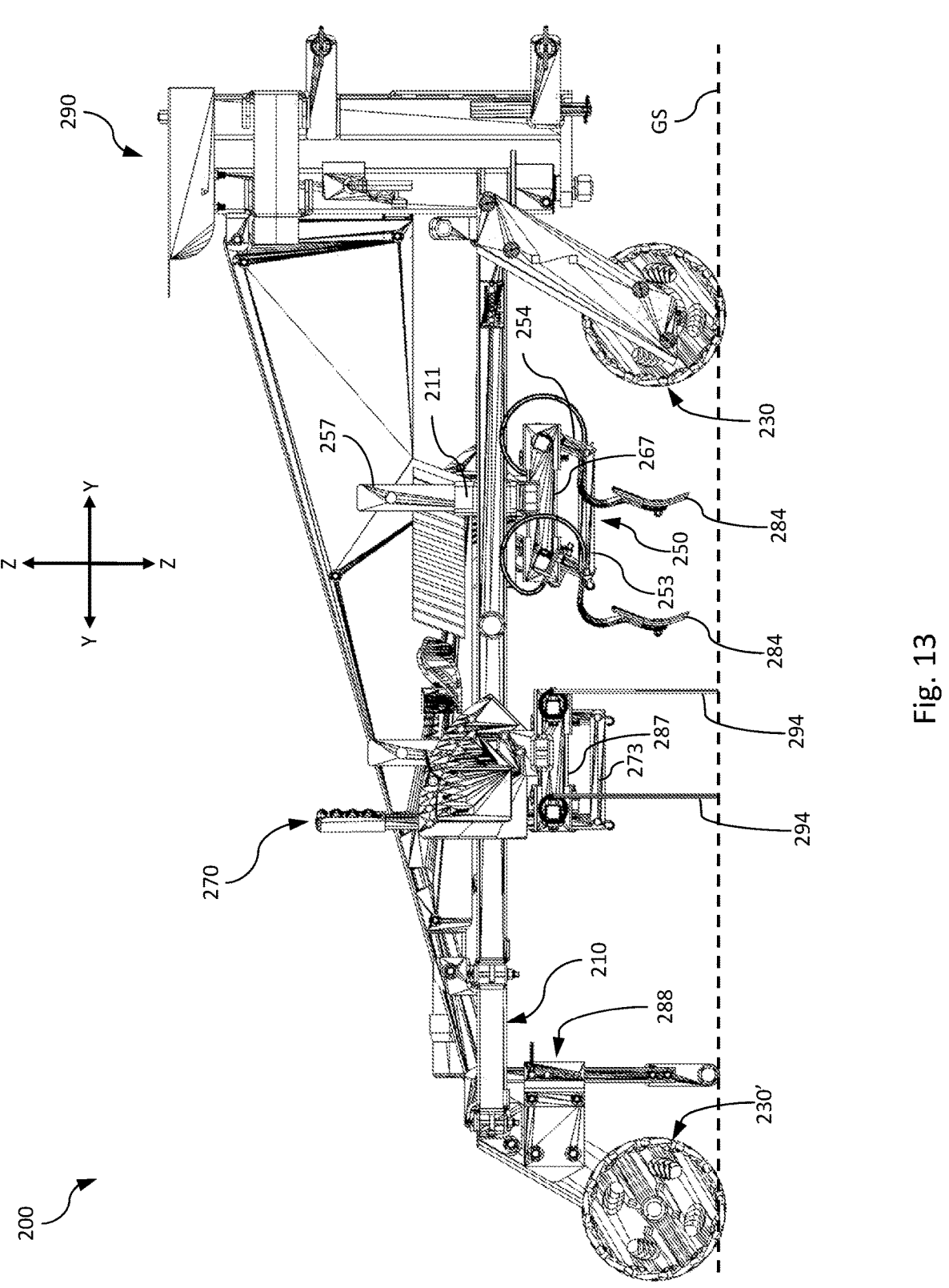
FIG. 13 is a side view illustrating certain aspects of the example equine footing conditioning tool of FIG. 11.
Figure 14:
FIG. 14 is a top view illustrating certain aspects of the example equine footing conditioning tool of FIG. 11.

Forward rolling basket 130 is rotatably is coupled with forward legs 105, 105' of chassis 110 and extends downward in the Z-axis direction to support the chassis on the underlying ground surface GS. As illustrated in isolation in FIG. 7, forward rolling basket 130 comprises a plurality of rods 122 coupled with a plurality of generally circular discs 124. In the illustrated embodiment the plurality of rods 122 are arranged in a generally helio-cylindrical configuration about the plurality of discs 124. In other embodiments, the plurality of rods 122 may arranged in other configurations such as straight-run cylindrical or spiral or other configurations. Rolling basket 130 further comprises axle ends 126 which extend outward from rolling basket 130 and rotatably coupled with forward legs 105, 105'

Rearward rolling basket 130' is rotatably coupled with rearward legs 106, 106' of chassis 110 and extends downward in the Z-axis direction to support the chassis 110 on the underlying ground surface GS. In the illustrated embodiment, rearward rolling basket 130' is provided in a substantially similar form and configuration as forward rolling basket 130. In other embodiments rearward rolling basket 130' may be differently configured and may vary from the configuration of forward rolling basket 130.

One or both of forward rolling basket 130, rearward rolling basket 130' may be provided in a number of other forms including features varying from those of the illustrated embodiment. For example, the alignment, cross-sectional shapes (e.g., X, Y, and/or Z-axis sectional shapes) length, number, orientation, spacing, and other attributes of the plurality of rods 122 may vary from the illustrated form. Additionally, the alignment, cross-sectional shapes (e.g., X, Y, and/or Z-axis sectional shapes), diameter, number, orientation, spacing, and other attributes of the plurality of rods 122 may vary from the illustrated form. Furthermore, the coupling and connection of the plurality of rods 122 and the plurality of discs 124 may me vary from the illustrated form, for example, with respect to alignment, coupling or connection locations, relative orientation, relative number or ratio, or other characteristics.

Tool adjustment assembly 150 comprises an axle 153 which is rotatably coupled with inner longitudinal beams 104, 104' of chassis 110 and which comprising an axis of rotation extending in the X-axis direction. Actuator 151 is coupled with chassis 110 at a joint 51 and is rotatable relative to the joint 51 in a direction corresponding to a Y-Z plane of the illustrated X-Y-Z coordinate system. Actuator 151 is coupled with axle 153 by wrench arm 152 a joint 53 and is rotatable relative to joint 53 in a direction corresponding to a Y-Z plane of the illustrated X-Y-Z coordinate system. Actuator 151 is extensible and retractable to apply force to wrench arm 152 to rotate axle 153 about its axis.

Tool adjustment assembly 150 further comprises transfer bars 155, 155' which are coupled with axle 153, by wrench arms 154, 154' at joints 54, 54' and is rotatable relative to joints 54, 54'in a direction corresponding to a Y-Z plane of the illustrated X-Y-Z coordinate system. Rotation of axle 153 about its axis applies force to transfer bars 155, 155' via wrench arms 154, 154'. Thus, actuator 151 is extensible and retractable to apply force to transfer bars 155, 155' via wrench arm 152, axle 153, and wrench arms 154, 154.

Tool adjustment assembly 150 also comprises tool carrier bar 159 which is coupled with transfer bars 155, 155' at joints 55, 55'. Guide bars 157, 157' are coupled with and extend upward in the Z-axis direction from tool carrier bar 159. Guide bars 157, 157' and tool carrier bar 159 are formed as a single unitary structure in the illustrated example, but may comprise separate structures coupled with one another. Guide bars 157, 157' are received by and pass through guide apertures 111, 111'. Actuator 151 is extensible and retractable to apply force to guide bars 157, 157' via wrench arm 152, axle 153, and wrench arms 154, 154, transfer bars 155, 155', and tool carrier bar 159 to cause guide bars 157, 157' to slidably translate through guide apertures 111, 111'.

In the illustrated example, actuator 151 comprises an electronically controllable hydraulic piston which can be adjusted to increase and decrease in length. Other embodiments contemplate other forms of actuator 151. In some embodiments, for example, actuator 151 may be provided in a similar form as actuator 171.

Tool adjustment assembly 150 can be controlled in an automated manner by an electronic control system. In the illustrated embodiments, the electronic control system includes a receiver 192 coupled with tool carrier bar 159 by a positioning pole 194 and an electronic controller 195 in operative communication with receiver 192, actuator 140, and optionally with actuator 142. Receiver 192 is moveable relative to and can be fixed in place in a plurality of positions along pole 194 in the Z-axis direction. This adjustability allows the receiver to be positioned relative to a reference signal source such as a rotating laser. Accordingly, in some forms receiver 192 may be structured as a laser receiver adapted to receive a laser beam output by a laser level apparatus, for example, a rotary laser, a single plane laser, a dual plane laser, a conical laser or a GPS laser. In other forms receiver 192 may be provide as or in combination with other types of wireless signal sources and signal detectors or receivers.

Electronic controller 195 may be structured as a microprocessor-based or microcontroller-based electronic control unit and may include wired input circuitry for receiving input from receiver 192 and/or wireless communication circuitry for receiving input from receiver 192. Electronic controller 195 may be configured to evaluate a reference signal, such as a laser beam received by receiver 192, and to determine actuator position adjustment commands based upon the received reference signal(s) and one or more operator-specified grading commands input to the electronic controller 195. The operator-specified grading commands input to the electronic controller may include a Z-axis grade elevation and a grade angle and direction which may be defined relative to the X-Y plane or another reference plane. Electronic controller 195 may further include output circuitry adapted to provide commands to one or more actuators, such as actuator 151 for adjustment of a working tool in accordance with the determined actuator position adjustment commands, for example, commands to operate a hydraulic actuator or a proportion valve of a hydraulic actuator or an electric actuator.

Electronic controller 195 may be structured to output control commands to adjust actuator 151 which is effective to adjust the position of ground engaging tool 60 in the Z-axis direction and the force applied to ground engaging tool 60 in the Z-axis direction. It shall be appreciated that a number of structures are herein referred to as "ground engaging" or the like which indicates that such structures are adapted and configured to engage an underlying ground surface under at least some operational conditions and does not necessarily require such structures to be continuously so engaged or so engaged under all operational conditions.

Tool adjustment assembly 170 comprises an axle 173 which is rotatably coupled with inner longitudinal beams 104, 104' of chassis 110 and which comprising an axis of rotation extending in the X-axis direction. Actuator 171 is coupled with chassis 110 at a joint 71 and is rotatable relative to the joint 71 in a direction corresponding to a Y-Z plane of the illustrated X-Y-Z coordinate system. Actuator 171 is coupled with axle 173 by wrench arm 172 a joint 73 and is rotatable relative to joint 73 in a direction corresponding to a Y-Z plane of the illustrated X-Y-Z coordinate system. Actuator 171 is extensible and retractable to apply force to wrench arm 172 to rotate axle 173 about its axis.

Tool adjustment assembly 170 further comprises transfer bars 175, 175' which are coupled with axle 173, by wrench arms 174, 174' at joints 74, 74' and is rotatable relative to joints 74, 74' in a direction corresponding to a Y-Z plane of the illustrated X-Y-Z coordinate system. Rotation of axle 173 about its axis applies force to transfer bars 175, 175' via wrench arms 174, 174'. Thus, actuator 171 is extensible and retractable to apply force to transfer bars 175, 175' via wrench arm 172, axle 173, and wrench arms 174, 174.

Tool adjustment assembly 170 also comprises tool carrier bar 179 which is coupled with transfer bars 175, 177' at joints 75, 75'. Guide bars 177, 177' are coupled with and extend upward in the Z-axis direction from tool carrier bar 179. Guide bars 177, 177' and tool carrier bar 179 are formed as a single unitary structure in the illustrated example, but may comprise separate structures coupled with one another. Guide bars 177, 177' are received by and pass through guide apertures 112, 112'. Actuator 171 is extensible and retractable to apply force to guide bars 177, 177' via wrench arm 172, axle 173, and wrench arms 174, 174, transfer bars 175, 175', and tool carrier bar 179 to cause guide bars 177, 157' to slidably translate through guide apertures 112, 112'.

In the illustrated example, actuator 171 comprises a mechanically actuatable top link which can be adjusted to increase and decrease in length. Other embodiments contemplate other forms of actuator 171. In some embodiments, for example, actuator 171 may be provided in a similar form as actuator 151. In some such embodiments, tool carrier bar 179 may be provided with an additional pole and receiver substantially similar to receiver 192 and pole 194.

Ground engaging tool 60 is coupled with tool carrier bar 159. Ground engaging tool 60 comprises a plurality of scarifying shanks 62 (only some of which are labeled to preserve clarity) coupled with the first tool carrier bar. In the illustrated example, the plurality of scarifying shanks 62 are arranged in a forward row 65 and a rearward row 66. A set of the plurality of scarifying shanks 62 of the forward row 65 are inserted into a plurality of apertures provided by shank carrier beams 67, 68 and are adjustable relative to the shank carrier beam 67 and the tool carrier bar 159. In the illustrated example, the plurality of scarifying shanks 62 are provided with pin notches and may be retained in a plurality of positions in the Z-axis direction by pins which are inserted into pin apertures provided in shank carrier beam 67. In the illustrated example, the set of the plurality of scarifying shanks 62 of the forward row 65 are adjusted to maximally extend below shank carrier beam 67 in the Z-axis direction. In contrast, the set of the plurality of scarifying shanks 62 of the rearward row 65 are adjusted to minimally extend below shank carrier beam 67 in the Z-axis direction.

Ground engaging tool 80 is coupled with tool carrier bar 179. Ground engaging tool 60 comprises a plurality of ground engaging spring tines 82 (only some of which are labeled to preserve clarity) coupled with the first tool carrier bar. In the illustrated example, the plurality of ground engaging spring tines 82 are arranged in a forward row 85 and a rearward row 86.

In the illustrated example, ground engaging tool 189 of tool adjustment assembly 180 is configured as leveling bar 189 extending in the X-axis direction. Leveling bar 189 is coupled with guide bars 187, 187' which extend upward in the Z-axis direction from leveling bar 189. Guide bars 187, 187' are received by and pass through guide apertures 113, 113' and can be adjusted to slidably translate through guide apertures 113, 113' to vary the Z-axis positioning of leveling bar 189.

In the illustrated embodiment, tool 100 is configured to provide an ordered arrangement of ground working structures. Starting from a forward direction and proceeding rearward, rolling basket 130 is provided as a first ground working structure, the plurality of scarifying shanks 62 are provided as a second ground working structure, the plurality of spring tines 82 are provided as a third ground working structure, leveling bar 189 is provided as a fourth ground working structure, and rolling basket 130' is provided as a fifth ground working structure.

In some embodiments, a sixth ground working structure may be provided in the form of one or more ground working implemented extended and positioned rearward to engage the underlying ground surface GS at a location rearward of the fifth ground working structure. Examples of sixth ground working structure according to the present disclosure include rakes, press plates, finishing bars, and finishing mats, among others.

It shall appreciated that the illustrated example, is particularly well suited to conditioning synthetic equine footings. As tool 100 is advanced relative to underlying ground surface, rolling basket 130 mixes and agitates an upper layer of equine footing material and breaks down clumped material. The plurality of scarifying shanks 62 may extend a greater depth into the underlying ground surface GS to loosen and break up a layer of equine footing below the upper layer. The depth of the conditioning provided by scarifying shanks 62 may be adjusted as described herein and may be moved in and out of play by either automatic or manual adjustment. The plurality of spring times 82 may extend the same depth or a greater or lesser depth into the underlying ground surface GS as scarifying shanks 62 to sift and further break up a selected layer of equine footing below the upper layer. The depth of the conditioning provided by spring times 82 may be adjusted as described herein and may be adjusted to move in and out of play. Leveling bar 189 may be provided and may be adjusted to provide a pre finishing compaction of the upper layer of the underlying grounds surface or may be omitted in some embodiments. Rolling basket 130' may be provided to mix, agitate, and pack an upper layer of equine footing material and breaks down clumped material.

Hitch 190 is configured to operatively couple tool 100 with a three-point hitch of a vehicle 20 which. It shall be appreciated that a three-point hitch refers to and includes a number of example hitches including three or more points of connection configured to couple a hitch with a work machine such as a tractor or various other vehicles or work machines as will occur to one of skill in the art with the benefit and insight of the present disclosure.

In the illustrated embodiment, hitch 190 is configured according to the example hitch 100 disclosed in co-pending U.S. application Ser. No. 17/932,010, titled SELF-ALIGNING, ENGAGEMENT-BIASED HITCH APPARATUSES, METHODS, AND SYSTEMS, and filed Sep. 14, 2022 the disclosure of which is hereby incorporated by reference. Accordingly, it shall be appreciated that a tow vehicle side of hitch 190 may be adjusted in response to adjustment of a three-point hitch of vehicle with which the vehicle-side of hitch 190 may be coupled. It shall be further appreciated that the hitch 190 is adapted to provide the auto-centering-on-lift features as well as the other structural and operational features disclosed in the aforementioned co-pending application. It shall be appreciated that hitch 190 is an example of a preferred tow hitch assembly that may be provided for tool 100 and that other types of tow hitch assemblies are also contemplated.

It shall be appreciated that additional embodiments may include a number of other types of tow hitch assemblies coupled with the chassis including, for example, conventional three-point hitches, a ball hitches, and pin hitches, among other hitches configured to operatively coupled tool 100 with a work machine in a tow-behind configuration.

With reference to FIGS. 11-14, there is illustrated an example equine footing conditioning tool 200 (also referred to herein as tool 200). Tool 100 comprises a chassis 210, a forward rolling basket 230 rotatably coupled with the chassis 110, a rearward rolling basket 230' rotatably coupled with the chassis 110 and spaced apart from the forward rolling basket 230, tool adjustment assemblies 250, 270, 288, and hitch 290.

In the illustrated embodiment, forward rolling basket 230 is provided in a form substantially similar to forward rolling basket 130 and rearward rolling basket 230' is provided in a form substantially similar to rearward rolling basket 230'. In other forms, forward rolling basket 230 and rearward rolling basket 230' may be provided in other forms varying including, for example, other forms such as those described in connection with forward rolling basket 130 and rearward rolling basket 130'.

Tool adjustment assembly 250 comprises tool carrier bar 259 which extends laterally in the X-axis direction. Guide bars 257 are coupled with and extend upward in the Z-axis direction from tool carrier bar 259. Guide bars 257 and tool carrier bar 259 are formed as separate conjoined structures in the illustrated example, but may in principle comprise a single unitary structure. Guide bars 257 are received by and pass through guide apertures 211. Guide bars 257 are slidably received in guide apertures 211 to raise and lower tool adjustment assembly 250 in a vertical Z-axis direction relative to chassis 210 and once adjusted to a desired position may be so maintained by a fixation pin.

Figure 15:
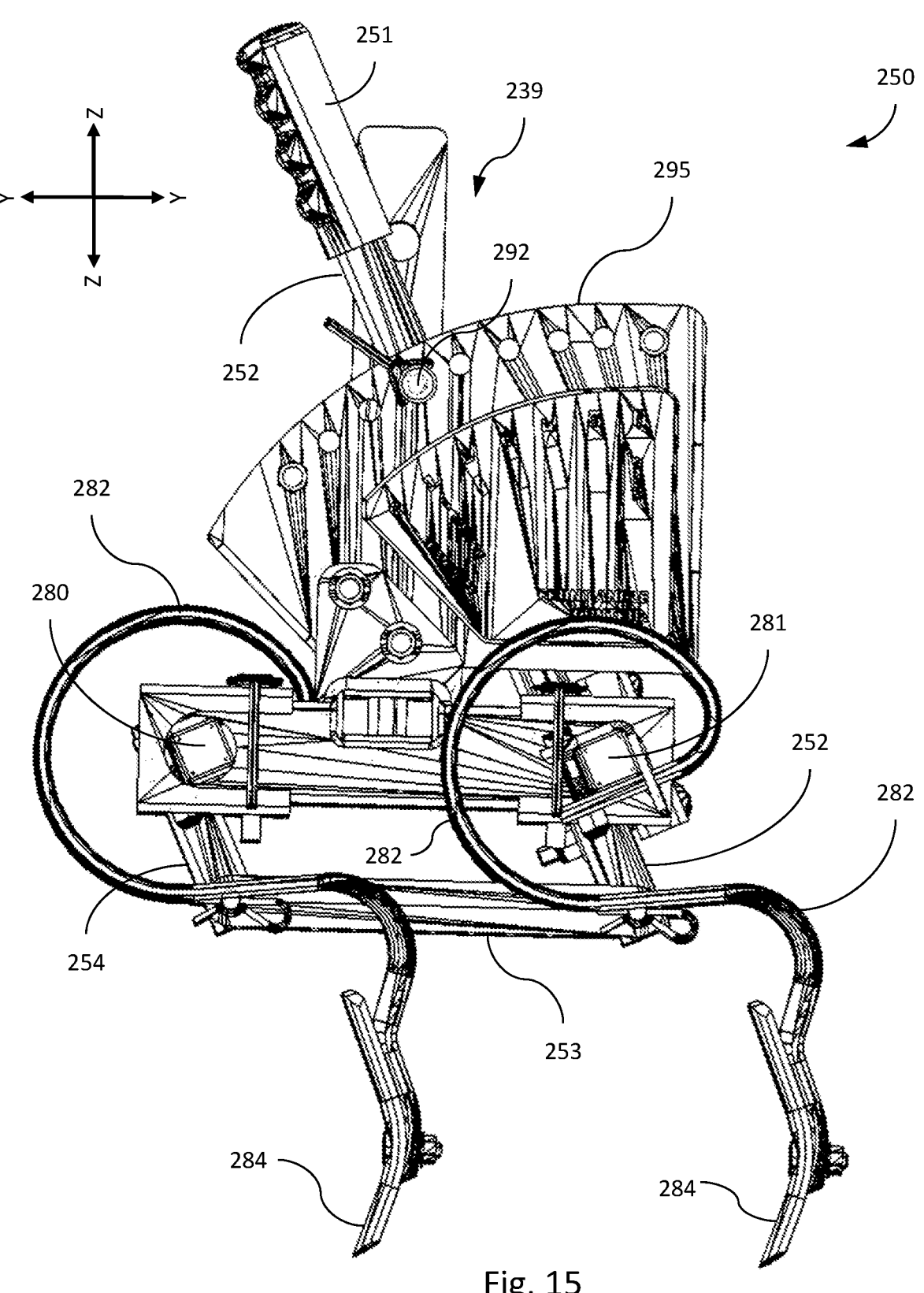
FIG. 15 is a side view illustrating certain aspects of a tool adjustment assembly of the example equine footing conditioning tool of FIG. 11.

As further illustrated in FIG. 15, tool adjustment assembly 250 includes an actuator 239 which is adjustable to vary the positioning of spring arms 282 and teeth 284 which are configured for and operable to engage and work underlying ground surface GS. Actuator 239 comprising a handle 251 which is adapted to be grasped by an operator and is operatively coupled with a lever arm 252. Lever arm 252 is coupled with axle 281 which is rotatably received in apertures defined in carriers 267 and is rotatable relative to chassis 210. In the illustrated example, axle 281 is provided in the form of an elongate shaft with a rectangular cross section. The rectangular cross section of the illustrated form of axle 281 may be preferred in some applications for facilitating force transfer to ground engaging implements coupled with axle 281.

Force applied to handle 251 by an operator may cause axle 281 to rotate relative to carriers 267 and chassis 210 about an axis normal to the Y-Z plane of the illustrated coordinated system. Such force is also transferred to links 253 generally in the Y-axis direction. Links 253, in turn, transfer force to lever arms 254 which are operatively coupled with axle 280 which is rotatably received in apertures defined in carriers 267. In the illustrated example, axle 280 is provided in the form of an elongate shaft with a rectangular cross section. The rectangular cross section of the illustrated form of axle 280 may be preferred in some applications for facilitating force transfer to ground engaging implements coupled with axle 280.

A first plurality of spring arms 282 are coupled with axle 280 and are rotatable therewith. A first plurality of teeth 284 are coupled with respective ones of the first plurality of spring arms 282. A second plurality of spring arms 282 are coupled with axle 281 and are rotatable therewith. A second plurality of teeth 284 are coupled with respective ones of the second plurality of spring arms 282.

The aforementioned rotation of axle 280 and axle 281 in response to force applied to handle 251 by an operator is effective to rotate spring arms 282 and teeth 284 to a plurality of positions including a maximally lowered position wherein the plurality of teeth 284 penetrate into an underlying grounds surface GS to a maximum depth (for a given vertical adjustment position of guide bars 257), a maximally raised position wherein the plurality of teeth 284 are raised above the underlying grounds surface GS to a maximum height, and a plurality of intermediate positions wherein the plurality of teeth may penetrate into the underlying ground surface GS to various lesser degrees than the maximally lowered position or may be raised above the underlying ground surface by various lesser degrees than the maximally raised position.

Once handle 251 is actuated by an operator such that spring arms 282 and teeth 284 are moved to a desired position, a fixation pin 292 may be inserted to one of a plurality of apertures formed in fixation bracket 295 to maintain handle 251, spring arms 282, and teeth 284 in a substantially fixed position.

Tool adjustment assembly 270 also comprises tool carrier bar 279 which extends laterally in the X-axis direction. Guide bars 277 are coupled with and extend upward in the Z-axis direction from tool carrier bar 179. Guide bars 277 and tool carrier bar 179 are formed as separate conjoined structures in the illustrated example, but may comprise a single unitary structure. Guide bars 277 are received by and pass through guide apertures 212. Guide bars 277 are slidably received in guide apertures 212 to raise and lower tool adjustment assembly 270 in a vertical Z-axis direction relative to chassis 210 and once adjusted to a desired position may be so maintained by a fixation pin.

Figure 16:
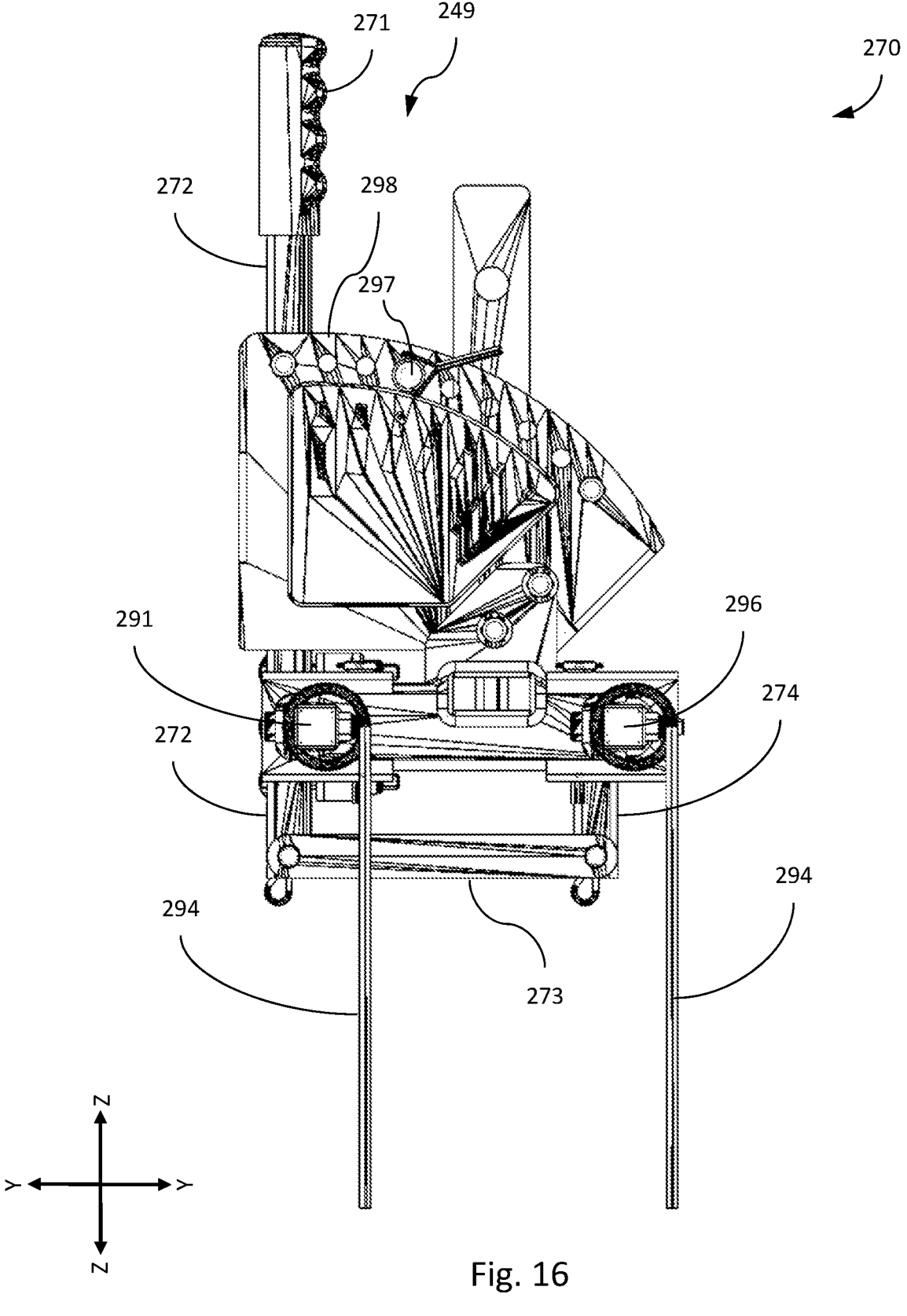
FIG. 16 is a side view illustrating certain aspects of a tool adjustment assembly of the example equine footing conditioning tool of FIG. 11.

As further illustrated in FIG. 16, tool adjustment assembly 270 includes an actuator 249 which is adjustable to vary the positioning of ground engaging spring tines 294 which are configured for and operable to engage and work underlying ground surface GS.

Actuator 249 comprising a handle 271 which is adapted to be grasped by an operator and is operatively coupled with a lever arm 272. Lever arm 272 is coupled with axle 291 which is rotatably received in apertures defined in carriers 287 and is rotatable relative to chassis 210. In the illustrated example, axle 291 is provided in the form of an elongate shaft with a rectangular cross section. The rectangular cross section of the illustrated form of axle 291 may be preferred in some applications for facilitating force transfer to ground engaging implements coupled with axle 291.

Force applied to handle 271 by an operator may cause axle 291 to rotate relative to carriers 287 and chassis 210 about an axis normal to the Y-Z plane of the illustrated coordinated system. Such force is also transferred to links 273 generally in the Y-axis direction. Links 273, in turn, transfer force to lever arms 274 which are operatively coupled with axle 296 which is rotatably received in apertures defined in carriers 267.

A first plurality of ground engaging spring tines 294 are coupled with axle 291 and are rotatable therewith. A second plurality of ground engaging spring tines 294 are coupled with axle 296 and are rotatable therewith. In the illustrated example, axle 296 is provided in the form of an elongate shaft with a rectangular cross section. The rectangular cross section of the illustrated form of axle 296 may be preferred in some applications for facilitating force transfer to ground engaging implements coupled with axle 296.

The aforementioned rotation of axle 296 and axle 291 in response to force applied to handle 271 by an operator is effective to rotate the plurality of ground engaging spring tines 294 to a plurality of positions including a maximally lowered position wherein the plurality of ground engaging spring tines 294 penetrate into an underlying grounds surface GS to a maximum depth (for a given vertical adjustment position of guide bars 277), a maximally raised position wherein the plurality of ground engaging spring tines 294 are raised above the underlying grounds surface GS to a maximum height, and a plurality of intermediate positions wherein the plurality of ground engaging spring tines 294 may penetrate into the underlying ground surface GS to various lesser degrees than the maximally lowered position or may be raised above the underlying ground surface by various lesser degrees than the maximally raised position.

Once handle 271 is actuated by an operator such that the plurality of ground engaging spring tines 294 are moved to a desired position, a fixation pin 297 may be inserted to one of a plurality of apertures formed in fixation bracket 298 to maintain handle 271 and the plurality of ground engaging spring tines 294 in a substantially fixed position.

The present disclosure contemplates a plurality of embodiments and several non-limiting example embodiments shall now be further described. A first example embodiment is an apparatus comprising: a chassis extending along a width in an X-axis direction, a length in a Y-axis direction, and a height in a Z-axis direction; a first ground-conditioning basket rotatably coupled with the chassis and extending downward in the Z-axis direction to support the chassis on an underlying ground surface; a second ground-conditioning basket rotatably coupled with the chassis and extending downward in the Z-axis direction to support the chassis on the underlying ground surface; a first tool adjustment assembly comprising a first axle rotatably coupled with the chassis and comprising a first axis of rotation extending in the X-axis direction, a first actuator coupled with the first axle and the chassis, a first transfer bar coupled with the first axle, a first tool carrier bar coupled with the first transfer bar, a first ground engaging tool coupled with the first tool carrier bar, and a first guide bar coupled with the first tool carrier bar extending in the Z-axis direction through a first guide aperture coupled with the chassis, the first actuator being adjustable to rotate the first axle to raise and lower the first tool carrier bar and first guide bar in the Z-axis direction; a second tool adjustment assembly comprising a first axle rotatably coupled with the chassis and comprising a second axis of rotation extending in the X-axis direction, a second actuator coupled with the second axle and the chassis, a second transfer bar coupled with the second axle, a second tool carrier bar coupled with the second transfer bar, a second ground engaging tool coupled with the second tool carrier bar, and a second guide bar coupled with the second tool carrier bar extending in the Z-axis direction through a second guide aperture coupled with the chassis, the second actuator being adjustable to rotate the second axle to raise and lower the second tool carrier bar and second guide bar in the Z-axis direction; and a tow hitch assembly coupled with the chassis.

A second example embodiment includes the features of the first example embodiment, wherein the first actuator comprises an electronically controllable hydraulic piston.

A third example embodiment includes the features of the second example embodiment, comprising: a receiver operatively coupled with the chassis and configured and operable to detect a wireless signal; and an electronic controller in operative communication with the receiver and the first actuator, the electronic controller being configured and operable to control the first actuator in response to a wireless signal detected by the receiver to adjust the electronically controllable hydraulic piston to raise and lower the first tool carrier bar in the Z-axis direction.

A fourth example embodiment includes the features of the third example embodiment, wherein the receiver is coupled with a pole and the pole is coupled with the first tool carrier bar.

A fifth example embodiment includes the features of the first example embodiment, wherein the second actuator comprises a mechanically actuatable top link.

A sixth example embodiment includes the features of the first example embodiment, wherein the first ground engaging tool comprises a plurality of scarifying shanks coupled with the first tool carrier bar.

A seventh example embodiment includes the features of the sixth example embodiment, wherein the plurality of a plurality of scarifying shanks comprise a first row of scarifying shanks and a second row of scarifying shanks spaced rearward of the first row of scarifying shanks in the Y-axis direction.

An eighth example embodiment includes the features of the sixth example embodiment, wherein the plurality of scarifying shanks are adjustably coupled with adjustable to a plurality of Z-axis positions relative to the first tool carrier bar.

A ninth example embodiment includes the features of the first example embodiment, wherein the second ground engaging tool comprises a plurality of ground engaging spring tines coupled with the first tool carrier bar.

A tenth example embodiment includes the features of the first example embodiment, wherein the plurality of scarifying shanks comprise a first row of scarifying shanks and a second row of scarifying shanks spaced rearward of the first row of scarifying shanks in the Y-axis direction.

An eleventh example embodiment includes the features of the first example embodiment, comprising a third tool adjustment assembly comprising a leveling bar extending in the X-axis direction, and a carrier bar extending in a Z axis direction through a third guide aperture coupled with the chassis, the carrier bar being adjustable to raise and lower the first tool carrier bar in the Z-axis direction.

While exemplary embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred, or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus comprising:
a chassis extending along a width in an X-axis direction, a length in a Y-axis direction, and a height in a Z-axis direction;
a first ground-conditioning basket rotatably coupled with the chassis and extending downward in the Z-axis direction to support the chassis on an underlying ground surface;
a second ground-conditioning basket rotatably coupled with the chassis and extending downward in the Z-axis direction to support the chassis on the underlying ground surface;

12 a first tool adjustment assembly comprising a first axle rotatably coupled with the chassis and comprising a first axis of rotation extending in the X-axis direction, a first actuator coupled with the first axle and the chassis, a first transfer bar coupled with the first axle, a first tool carrier bar coupled with the first transfer bar, a first ground engaging tool coupled with the first tool carrier bar, and a first guide bar coupled with the first tool carrier bar extending in the Z-axis direction through a first guide aperture coupled with the chassis, the first actuator being adjustable to rotate the first axle to raise and lower the first tool carrier bar and first guide bar in the Z-axis direction; a second tool adjustment assembly comprising a second axle rotatably coupled with the chassis and comprising a second axis of rotation extending in the X-axis direction, a second actuator coupled with the second axle and the chassis, a second transfer bar coupled with the second axle, a second tool carrier bar coupled with the second transfer bar, a second ground engaging tool coupled with the second tool carrier bar, and a second guide bar coupled with the second tool carrier bar extending in the Z-axis direction through a second guide aperture coupled with the chassis, the second actuator being adjustable to rotate the second axle to raise and lower the second tool carrier bar and second guide bar in the Z-axis direction; and
a tow hitch assembly coupled with the chassis.

2. The apparatus of claim 1, wherein the first actuator comprises an electronically controllable hydraulic piston.

3. The apparatus of claim 2, comprising:
a receiver operatively coupled with the chassis and configured and operable to detect a wireless signal; and
an electronic controller in operative communication with the receiver and the first actuator, the electronic controller being configured and operable to control the first actuator in response to a wireless signal detected by the receiver to adjust the electronically controllable hydraulic piston to raise and lower the first tool carrier bar in the Z-axis direction.

4. The apparatus of claim 3, wherein the receiver is coupled with a pole and the pole is coupled with the first tool carrier bar.

5. The apparatus of claim 1, wherein the second actuator comprises a mechanically actuatable top link.

6. The apparatus of claim 1, wherein the first ground engaging tool comprises a plurality of scarifying shanks coupled with the first tool carrier bar.

7. The apparatus of claim 6, wherein the plurality of scarifying shanks comprise a first row of scarifying shanks and a second row of scarifying shanks spaced rearward of the first row of scarifying shanks in the Y-axis direction.

8. The apparatus of claim 6, wherein the plurality of scarifying shanks are adjustably coupled with adjustable to a plurality of Z-axis positions relative to the first tool carrier bar.

9. The apparatus of claim 1, wherein the second ground engaging tool comprises a plurality of ground engaging spring tines coupled with the first second tool carrier bar.

10. The apparatus of claim 9, wherein the plurality of ground engaging spring tines comprise a first row of ground engaging spring tines and a second row of ground engaging spring tines spaced rearward of the first row of ground engaging spring tines in the Y-axis direction.

11. The apparatus of claim 1, comprising a third tool adjustment assembly comprising a leveling bar extending in the X-axis direction, and a carrier bar extending in the Z axis direction through a third guide aperture coupled with the chassis, the carrier bar being adjustable to raise and lower the leveling bar in the Z-axis direction.

12. An apparatus comprising:
  a chassis extending along a width in an X-axis direction, a length in a Y-axis direction, and a height in a Z-axis direction;
  a first ground-conditioning basket rotatably coupled with the chassis and extending downward in the Z-axis direction to support the chassis on an underlying ground surface;
a second ground-conditioning basket rotatably coupled with the chassis and extending downward in the Z-axis direction to support the chassis on the underlying ground surface;
a tool adjustment assembly operatively coupled with the chassis and comprising a first lever arm coupled with a first axle, the first axle being rotatably coupled with the chassis, a first plurality of ground engaging projections coupled with and extending outward from the first axle, a link rotatably coupled with the first lever arm, a second lever arm rotatably coupled with the link, a second axle coupled with the second lever arm, the second axle being rotatably coupled with the chassis, and a second plurality of ground engaging projections coupled with and extending outward from the second axle, wherein the first lever arm is adjustable to a plurality of positions to raise and lower the first plurality of ground engaging projections and the second plurality of ground engaging projections relative to the underlying ground surface; and
  a tow hitch assembly coupled with the chassis.
  13. The apparatus of claim 12, wherein the tool adjustment assembly comprises a third lever arm coupled with the first axle, a second link rotatably coupled with the third lever arm, and a fourth lever arm rotatably coupled with the second link and the second axle, the third lever arm, the second link, and the fourth lever arm being laterally spaced apart from the first lever arm, the first link, and the second lever arm in a direction along the length of the first axle and the second axle.
  14. The apparatus of claim 12, wherein the first plurality of ground engaging projections comprise a first plurality of spring arms and a first plurality of teeth coupled with respective ones of the plurality of spring arms and the second plurality of ground engaging projections comprise a second plurality of spring arms and a second plurality of teeth coupled with respective ones of the second plurality of spring arms.
  15. The apparatus of claim 12, comprising: a rearward tool adjustment assembly operatively coupled with the chassis at a location rearward of the tool adjustment assembly and comprising a rearward first lever arm coupled with a rearward first axle, the rearward first axle being rotatably coupled with the chassis, a rearward first plurality of ground engaging projections coupled with and extending outward from the rearward first axle, a rearward link rotatably coupled with the rearward first lever arm, a rearward second lever arm rotatably coupled with the rearward link, a rearward second axle coupled with the rearward second lever arm, the rearward second axle being rotatably coupled with the chassis, and a rearward second plurality of ground engaging projections coupled with and extending outward from the rearward second axle, wherein the rearward first lever arm is adjustable to a plurality of positions to raise and lower the rearward first plurality of ground engaging projections and the rearward second plurality of ground engaging projections relative to the underlying ground surface.
  16. The apparatus of claim 15, wherein the rearward tool adjustment assembly comprises a rearward third lever arm coupled with the rearward first axle, a rearward second link rotatably coupled with the rearward third lever arm, and a rearward fourth lever arm rotatably coupled with the rearward second link and the rearward second axle, the rearward third lever arm, the rearward second link, and the rearward fourth lever arm being laterally spaced apart from the rearward first lever arm, the rearward first link, and the rearward second lever arm in a direction along the length of the rearward first axle and the rearward second axle.
  17. The apparatus of claim 15, wherein the rearward first plurality of ground engaging projections comprise a first plurality of ground engaging spring tines and the rearward second plurality of ground engaging projections comprise a second plurality of ground engaging spring tines.
  18. The apparatus of claim 15, wherein at least one of the rearward first axle and the rearward second axle is provided in the form of a shaft with a rectangular cross section.

* * * * *